(12) United States Patent
Lyons

(10) Patent No.: US 6,338,593 B1
(45) Date of Patent: Jan. 15, 2002

(54) BOWING RESISTANT RIGHT ANGLE CORNER CONNECTOR

(75) Inventor: John Lyons, Levittown, NY (US)

(73) Assignee: Duro Dyne Corporation, Farmingdale, NY (US)

( * ) Notice: Subject to any disclaimer, the term of this patent is extended or adjusted under 35 U.S.C. 154(b) by 0 days.

(21) Appl. No.: 09/571,291

(22) Filed: May 16, 2000

(51) Int. Cl.$^7$ .................................................. F16B 7/00
(52) U.S. Cl. ........................ 403/403; 403/401; 403/382; 403/329
(58) Field of Search ................................ 403/382, 401, 403/402, 403, 326, 329; 285/424, 405

(56) References Cited

U.S. PATENT DOCUMENTS

| 3,932,046 A | * | 1/1976 | Kawazu ................ 403/402 X |
| 4,508,376 A | | 4/1985 | Arnoldt |
| 4,835,935 A | * | 6/1989 | Murphy ................ 403/403 X |
| B14,508,376 | | 5/1997 | Arnoldt |
| 5,842,919 A | | 12/1998 | Lyons et al. |

* cited by examiner

Primary Examiner—Lynne H. Browne
Assistant Examiner—John R. Cottingham
(74) Attorney, Agent, or Firm—Barry G. Magidoff; Paul J. Sutton

(57) ABSTRACT

A bow resistant connector for coupling frame components at right angles to each other includes a pair of legs extending from an apex, the legs being disposed at right angles to each other. The lateral side edges of the legs include fingers the outer surfaces of the fingers being formed with barbs for locking the leg to a respective frame member. The fingers are separated from the main body of the legs by slots. A boss is deflected from the body of the leg outwardly to provide a reinforcing rib, the boss being located between and in general alignment with the fingers. A secondary boss or rib member is formed adjacent the lead edge of the leg the secondary boss extending to the opposite side of the leg from the main rib or boss. The secondary boss engages a surface of the frame to provide additional stability to the connection between the connector leg and the frame component.

3 Claims, 3 Drawing Sheets

BOWING RESISTANT RIGHT ANGLE CORNER CONNECTOR

BACKGROUND OF THE INVENTION

The present invention is directed to a corner connector for joining linear frame members at right angles to each other. More particularly, invention is directed to a right angle corner connector for linking frame members of considerable widths such as a frame member in which is mounted air flow control louvers.

It is well known to form a rectangular frame comprised of four linear frame components the terminal edges of the frame components being linked by right angle connectors. For instance, picture frames are frequently formed by providing frame components having their end margins mitered at 45° angles. The end portions may include apertures extending linearly of the components. Adjacent frame components are fixed in position relative to each other by a right angle piece having legs extending into the apertures of the respective components. An example of such a structure in an industrial application, namely as a means for connecting the opposed ends of rectangular duct sections, is disclosed in U.S. Pat. No. 4,508,376.

In many applications, the right angle connectors are maintained in position by a fictional interfit between the legs of the connector and complemental bores formed in the connected channels. Where the channels are narrow, it is feasible to utilize a connector component having simple leg configurations in section, i.e. the legs may be circular in section and fit into circular bores formed at the ends of the channels. With the example given, there is little likelihood of distorting the connector as it is forced into frictional engaged position within the apertures of the frame forming components, since the connection may comprise a solid rod etc.

A different problem exists where the frame components to be connected are of substantial widths or depths.

In structures of the noted sort (wide frame members) it is desirable that the corner connectors extend substantially the entire width of the connected components. For example, in connecting two wide frame members it is undesirable to employ a right angle connector which engages only a central portion of the respective frame components since the assembled frame would then be susceptible to twisting under applied stresses.

In providing a connector for wide linear frame components unique problems are presented. It is highly desirable that the connector be firmly received in the frame components so that the components cannot become separated. However, when the connector component is seated under the high compressive forces required to provide stability to the frame, such forces may result in a bowing or outward deflection of the connector.

There is accordingly a need for a right angle connector component which may be seated within the channels of abutting frame members and subjected to substantial compressive forces to assure interlocking of the frames while at the same time being resistant to bowing or deflection. In particular, there is shown in U.S. Pat. No. 5,842,919 assigned to the Assignee of the instant application a rectangular frame assembly having louvers controlled by elements shiftable linearly of the frame. In the event that the connector component should become bowed, an interference may exist between the distorted connector and the moving components.

SUMMARY OF THE INVENTION

The present invention may be summarized as directed to a bow resistant right angle connector for forming a rectangular frame the terminal ends of frame components being linked by four of the connectors. The connectors are provided with finger components separated from the mass of the component legs by slots. The connector includes a transversely directed boss deflected outwardly from the plane of the legs of the connector the boss being in registry with the slots. Such a structure enables the connector to be driven into complemental receiver channels of the frame under substantial force, the connector being resistant to bowing by the conjoint action of the boss and fingers. Optionally the legs of the connector may include a lead edge which extends inwardly away from the plane of the major portion of the connector whereby an additional stabilizing influence between the connector and the frame component is provided.

DETAILED DESCRIPTION OF DRAWINGS

Figure 1:
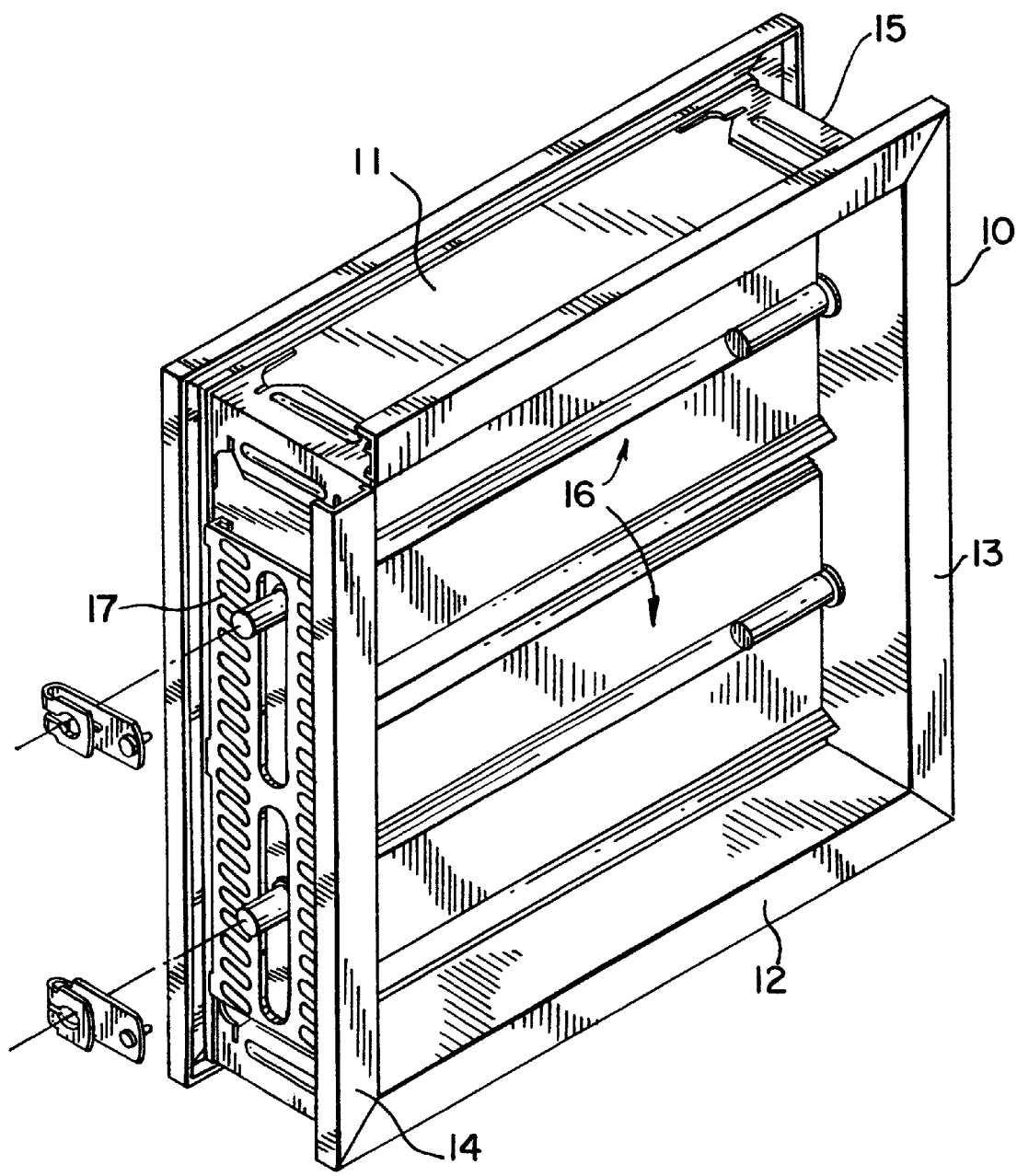
FIG. 1. is an isometric view of a rectangular damper assembly the frame components being connect by right angle corner brackets in accordance with the invention.

There is disclosed in FIG. 1. a rectangular frame assembly 10 comprised of an upper frame 11 lower frame 12 and side frames 13 14. Each side frame is connected at its upper and lower end to a respective upper and lower frame 11 12 by a corner bracket or connector 15 comprising the heart of the instant invention.

While the utility of the present invention is not limited to a damper assembly, it is noted that the instant assembly includes louvers 16 mounted pivotally between the side frames 13,14, the louvers being driven by a slidable frame 17 vertically movably mounted within side frame component 14. The drive assembly is a subject of said U.S. Pat. No. 5,842,919 it being sufficient to note that the upward and downward movement of the frame 17 controls the position of the louvers and therefore any interference with the smooth movement of the frame within the side frame element 14 would result in an interruption or improper operation of the louvers.

Figure 2:
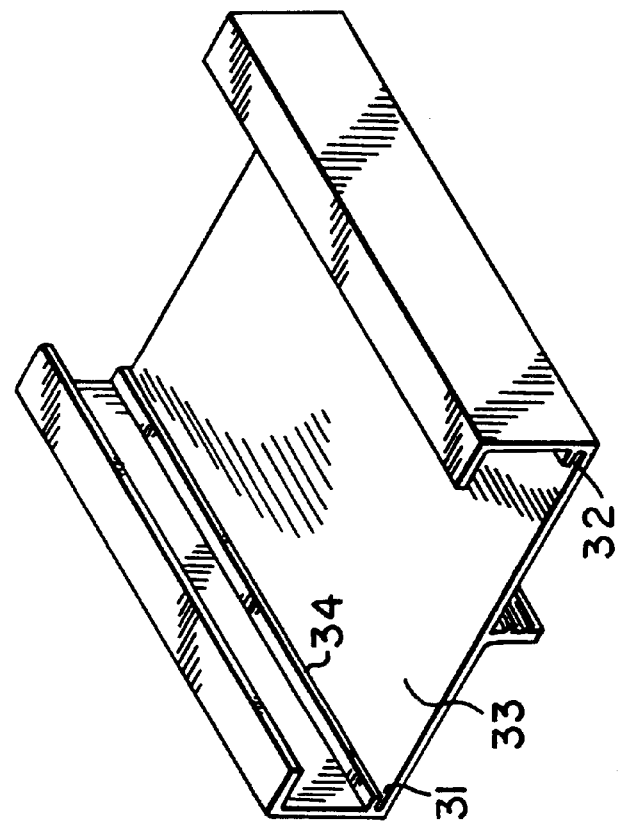
FIG. 2. is an isometric view of a corner connector in accordance with the invention and a frame component adapted to receive the connector.
Figure 2:
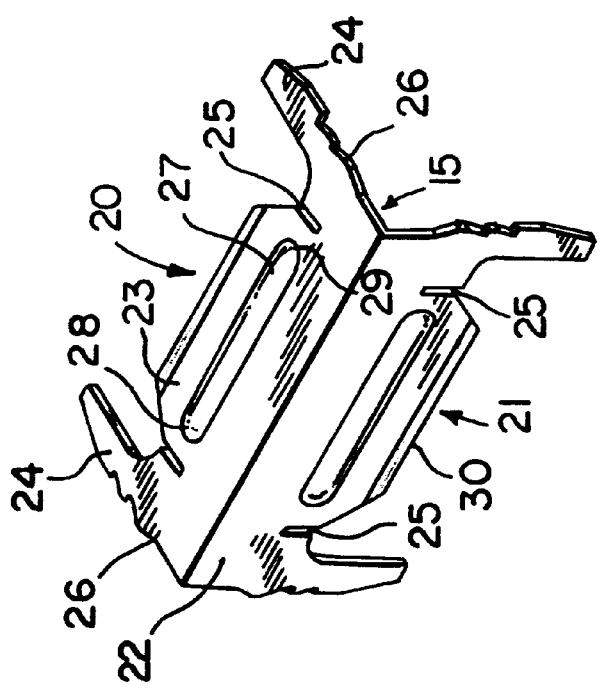
Figure 3:
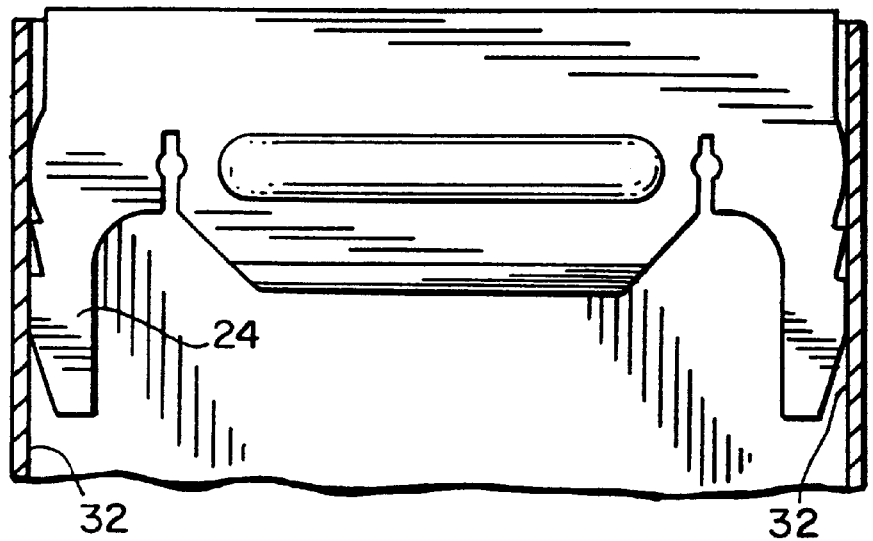
FIG. 3. is a sectional view through a frame member illustrating the interfitted frame and connector components.

The configuration of the corner connector members 15 is best appreciated from an inspection of FIG. 2. The connectors 15 are comprised of a unitary metal component including first and second legs 20 21 extending at right angles from an apex 22. The legs 20 21 include a central tongue portion 23,23. The side edges of the legs 20 21 are comprised of fingers 24 separated from the tongue component by slots 25. The side margins of the fingers are provided with the barbs or teeth 26.

The tongue portions 23 include an outwardly deflected boss 27. The boss running transversely, the side margins 28 29 of the boss terminating proximate the respective slots 25. Preferably, the lead edge 30 of the tongue 23 is deflected inwardly from plane of the leg 20.

As will be apparent from the views, each of the legs 20 and 21 is driven into a side and upper or lower frame component, the frame components being mitered at 45° angles and provided with opposed longitudinally extending channels 31 32. The channels are formed between the inner surface 33 of the frame member and longitudinally extending ribs 34.

Figure 4:
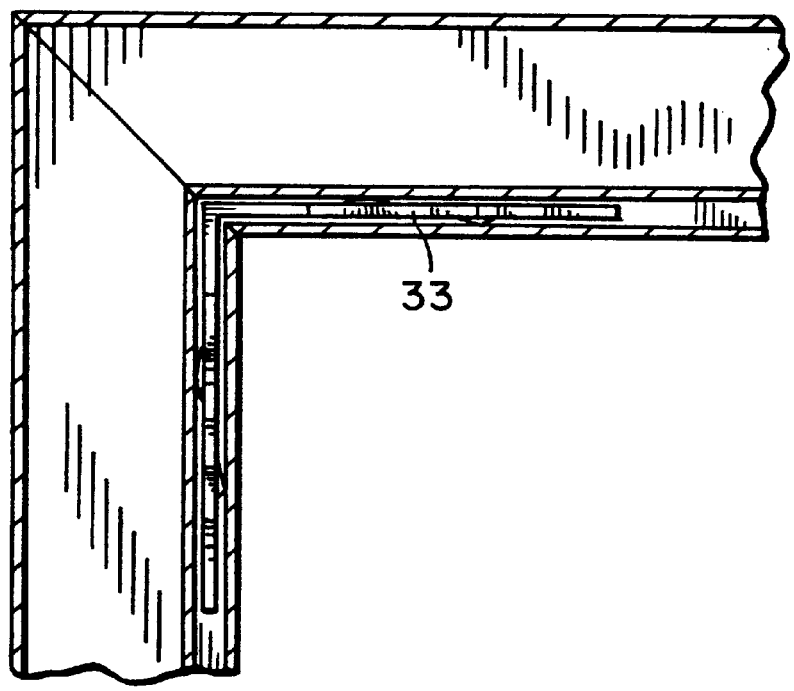
FIG. 4. is a sectional view of an assembled corner component with portions of the frame components broken away to show details of construction.

In FIG. 4 there is disclosed the configuration of the parts after the legs 20 21 have been driven into channels 31 32. In the inserted position, the fingers 24 have been forced into the respective channels 31 32 under high compressive forces which would normally (in the absence of the slots and boss) cause the entire body of the legs to bow outwardly. As a result of the conjoint action of the slots and the boss 27, however, the connector legs are resistant to bowing notwithstanding that the connector has been driven into position under substantial force. While it would be possible to avoid bowing by providing a connector the side margins of which are only slightly oversized as respects the distance between the channels 31 and 32, such a structure would achieve only a limited interconnection between the connector legs and frame components.

As best shown in FIG. 4, the bevel or outer boss 30 provides a further stabilizing action as the same is yieldably urged against the surface 33 of the frames in the inserted position of the connector.

As will be apparent from the preceding description there is provided in accordance with the invention a novel right angle connector or bracket component for linking linear frame components at right angles to each other. The connector provides a high degree of resistance to bowing notwithstanding the application of high forces applied against the side and margins of the connector, such high forces providing assurance against separation of the connector from the frames.

As will be apparent to those skilled in the art and familiarized with the instant disclosure numerous changes in details of construction may be made without departing from the spirit of the invention.

What is claimed is:

1. A bow resistant right angle corner connector for joining a pair of linear frame components having opposed spaced parallel longitudinally directed channels, said connector comprising a pair of generally planar legs disposed at right angles to each other said legs being joined at an apex, each said leg comprising a central tongue portion and a finger disposed adjacent each side of said tongue, the entirety of said fingers being in coplanar alignment with said tongue, a slot interposed between each said finger and said tongue said slots being directed generally perpendicular to said apex, a reinforcing boss in said central tongue deflected outwardly from the plane of said legs, said boss extending transversely of said tongue, and parallel to said apex, said boss being disposed between and in substantial alignment with said slots, said tongue being resistant to bowing distortion responsive to compressive forces urging said fingers toward each other as a result of the presence of said boss.

2. A connector in accordance with claim 1 wherein said tongue portion includes a lead edge extending away from the plane of said apex said lead edge including a raised portion deflected inwardly from the plane of said leg.

3. Connector in accordance with claim 2 wherein said fingers include side margins, the outer surface of said side margins including barb portions in coplanar alignment with said tongue.

* * * * *